US011222127B2

(12) United States Patent
Ghosh et al.

(10) Patent No.: US 11,222,127 B2
(45) Date of Patent: Jan. 11, 2022

(54) PROCESSOR HARDWARE AND INSTRUCTIONS FOR SHA3 CRYPTOGRAPHIC OPERATIONS

(71) Applicant: Intel Corporation, Santa Clara, CA (US)

(72) Inventors: Santosh Ghosh, Hillsboro, OR (US); Michael LeMay, Hillsboro, OR (US); Manoj R. Sastry, Portland, OR (US); David M. Durham, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 211 days.

(21) Appl. No.: 16/709,837

(22) Filed: Dec. 10, 2019

(65) Prior Publication Data

US 2020/0117811 A1 Apr. 16, 2020

(51) Int. Cl.

| | |
|---|---|
| ***G06F 21/60*** | (2013.01) |
| ***G06F 21/72*** | (2013.01) |
| ***H04L 9/06*** | (2006.01) |
| ***G06F 9/30*** | (2018.01) |

(52) U.S. Cl.

CPC ........ *G06F 21/602* (2013.01); *G06F 9/30029* (2013.01); *G06F 21/72* (2013.01); *H04L 9/0643* (2013.01); *H04L 2209/12* (2013.01)

(58) Field of Classification Search

None

See application file for complete search history.

(56) References Cited

U.S. PATENT DOCUMENTS

| | | | | |
|---|---|---|---|---|
| 11,093,213 | B1 * | 8/2021 | Lablans | H03M 7/00 |
| 2014/0129830 | A1 * | 5/2014 | Raudaschl | G06F 21/6272 713/165 |
| 2018/0211064 | A1 * | 7/2018 | Ndu | H04L 9/0643 |
| 2019/0379547 | A1 * | 12/2019 | Durham | H04L 69/04 |

(Continued)

OTHER PUBLICATIONS

FIPS PUB 202, "SHA-3 Standard: Permutations-Based Hash and Extendable-Output Functions," Federal Information Processing Standards Publication, Information Technology Laboratory, National Institute of Standards and Technology, Gaithersburg, MD, Aug. 2015 (37 pages).

(Continued)

*Primary Examiner* — Simon P Kanaan

(74) *Attorney, Agent, or Firm* — Alliance IP, LLC

(57) ABSTRACT

A microcoded processor instruction may invoke a number of microinstructions to perform a round of a SHA3 operation using a circuit that includes a first stage circuit to perform a set of first bitwise XOR operations on a set of five input blocks to yield first intermediate output blocks; perform a set of second bitwise XOR operations on a first intermediate block and a rotation of another first intermediate block to yield second intermediate blocks; and perform a set of third bitwise XOR operations on a second intermediate block and an input block to yield third intermediate blocks. The circuit further includes a second stage circuit to rotate bits within each of the third intermediate blocks to yield a set of fourth intermediate blocks, and a third stage circuit to perform an affine mapping on bits within each of the fourth intermediate blocks to yield a set of output blocks.

25 Claims, 10 Drawing Sheets

100

Round = 0

102 θ-stage

104 ρ-stage

106 π-stage

108 χ-stage

110 ι-stage

112 Round == 24?

No

Round = Round + 1

Yes

Stop

(56) References Cited

U.S. PATENT DOCUMENTS

| | | | | |
|---|---|---|---|---|
| 2020/0012495 | A1* | 1/2020 | Aly | G06F 9/30032 |
| 2020/0213091 | A1* | 7/2020 | Mai | G06F 12/1408 |
| 2020/0267131 | A1* | 8/2020 | Tal | H04W 12/0433 |

OTHER PUBLICATIONS

Kelsey, John et al., "SHA-3 Derived Functions: eShake, KMAC, TupleHash, and Parallel Hash," NIST Special Publication 800-185, National Institute of Standards and Technology, U.S. Department of Commerce, Dec. 2016 (36 pages).

* cited by examiner

PROCESSOR HARDWARE AND INSTRUCTIONS FOR SHA3 CRYPTOGRAPHIC OPERATIONS

TECHNICAL FIELD

This disclosure relates in general to the field of computer systems and, more particularly, to processor hardware and instructions for implementing the SHA3 cryptographic operation.

BACKGROUND

Cryptographic hashes are one of the most essential operations for providing data integrity and authentication, and are used in a variety of platforms. The Secure Hash Algorithm 3 (SHA3) is a relatively new National Institute of Standards and Technology (NIST) standard cryptographic hash operation and is becoming an increasingly popular hash algorithm for computing a digest of a large image/data for classical signature schemes (e.g., Elliptic Curve Digital Signature Algorithm (ECDSA) and Rivest-Shamir-Adleman (RSA) schemes), post-quantum signature schemes (e.g., Hash Based Signatures), and certain SHA3-derived functions (e.g., KECCAK Message Authentication Code (KMAC), customizable Secure Hash Algorithm and KECCAK (cSHAKE), TupleHash, and ParallelHash). SHA3 supports large input block size and provides same security guaranty in a fewer number of rounds, specifically supporting a 1088-bit block size and 24 rounds compared to the 512-bit block size and 64 rounds provided by SHA2. However, software implementations of SHA3 may be slower than software implementations of SHA2. Further, the SHA3 permutation is based on bit-shifts, bit-rotations and Boolean operations performed on a 1600-bit state variable, and existing architectures may be inefficient in performing independent bit operations on a large variable (e.g., 1600-bits).

BRIEF DESCRIPTION OF THE DRAWINGS

To provide a more complete understanding of the present disclosure and features and advantages thereof, reference is made to the following description, taken in conjunction with the accompanying figures, where like reference numerals represent like parts, in which.

DETAILED DESCRIPTION

The following disclosure provides various possible embodiments, or examples, for implementation of cryptographic computing. Cryptographic computing is an important trend in computing, with the very foundation of computing itself is becoming fundamentally cryptographic. Cryptographic computing represents a sea change, a fundamental rethinking of systems security with wide implications for the industry.

Cryptographic hashes are one of the most essential operations for providing data integrity and authentication, and are used in a variety of platforms. The Secure Hash Algorithm 3 (SHA3) is a relatively new National Institute of Standards and Technology (NIST) standard cryptographic hash operation and is becoming an increasingly popular hash algorithm for computing a digest of a large image/data for classical signature schemes (e.g., Elliptic Curve Digital Signature Algorithm (ECDSA) and Rivest-Shamir-Adleman (RSA) schemes), post-quantum signature schemes (e.g., Hash Based Signatures), and certain SHA3-derived functions (e.g., KECCAK Message Authentication Code (KMAC), customizable Secure Hash Algorithm and KECCAK (cSHAKE), TupleHash, and ParallelHash). SHA3 supports large input block size and provides same security guaranty in a fewer number of rounds, specifically supporting a 1088-bit block size and 24 rounds compared to the 512-bit block size and 64 rounds provided by SHA2. However, software implementations of SHA3 may be slower than software implementations of SHA2. Further, the SHA3 permutation is based on bit-shifts, bit-rotations and Boolean operations performed on a 1600-bit state variable, and existing architectures may be inefficient in performing independent bit operations on a large variable (e.g., 1600-bits).

Accordingly, aspects of the present disclosure provide for hardware acceleration for SHA3 operations. In some cases, this may help to accelerate SHA3 operations in software and provide better performance for secure boot, secure update, attestation, authenticating applications and data in cloud environments, etc. In particular, certain aspects recognize that bit operations in the SHA3 round function are independent to each other, which are the main reason for poor SW performance of SHA3. Existing architectures are unable to compute multiple independent Boolean logic operations and bit level permutations of a large variable (e.g., 1600-bit) in parallel. However, the present disclosure provides novel implementations for computing multiple bit level operations required for SHA3 hash operations, and includes a range of new instructions that may provide different levels of performance benefits for executing SHA3 on processor cores. The implementations may be used in SHA3 operations for any of the signature schemes and SHA3-derived functions described above, as well as for SHA3 operations in any other context/scheme.

Figure 1:
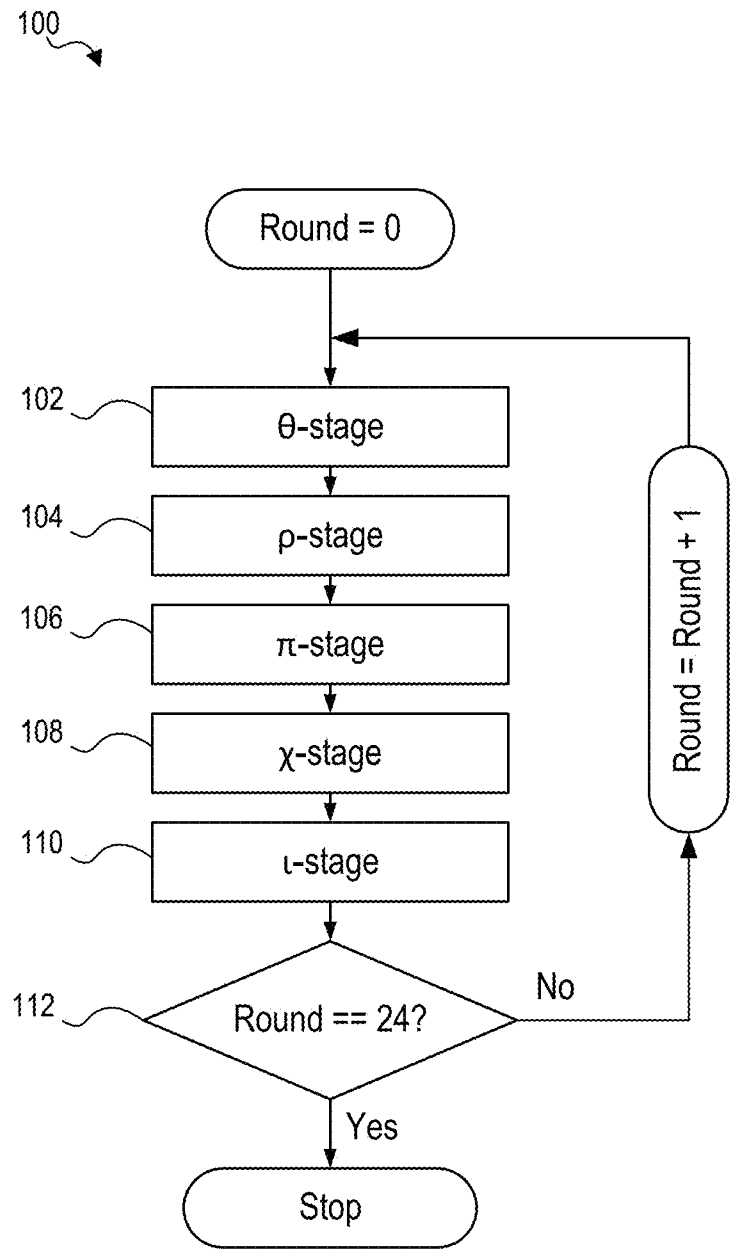
FIG. 1 is a simplified flow diagram of a process for performing multiple rounds of a SHA3 operation.

Turning to FIG. 1, a simplified flow diagram of a process 100 for performing multiple rounds of a SHA3 operation is illustrated. As shown, one round of the SHA3 operation includes five stages (102, 104, 106, 108, 110) that are computed on a 1600-bit state variable. Each stage in the process 100 is based on multiple independent intra-bit operations, permutations, and rotations on the 1600-bit variable.

The θ-stage 102 modifies an input state variable A as defined by the following equations provided by the SHA-3 originators:

$$C[x]=A[x,0]\oplus A[x,1]\oplus A[x,2]\oplus A[x,3]\oplus A[x,4],\forall x \text{ in } 0 \ldots 4 \quad \#(1)$$

$$D[x]=C[x-1]\oplus \mathrm{ROT}(C[x+1],1),\forall x \text{ in } 0 \ldots 4 \quad \#(2)$$

$$A[x,y]=A[x,y]\oplus D[x],\forall(x,y) \text{ in } (0 \ldots 4,0 \ldots 4). \quad \#(3)$$

The ρ-stage 104 and π-stage 106 are rotation and permutation operations performed on the A[x, y] value produced by Equation (3), as defined in the following equation provided by the SHA-3 originators:

$$B[y,2x+3y]=\mathrm{ROT}(A[x,y],r[x,y]),\forall(x,y) \text{ in } (0 \ldots 4,0 \ldots 4). \quad \#(4)$$

The χ-stage 108 in the SHA-3 algorithm consists of nonlinear operations. However, this stage and the ι-stage 110 may be computed by following equation, as defined by the SHA-3 originators:

$$A[x,y]=B[x,y]\oplus((\neg B[x+1,y])\&\ B[x+2,y]),\forall(x,y) \text{ in } (0 \ldots 4,0 \ldots 4). \quad \#(5)$$

The output of the ι-stage 110 is then either provided as the input to the next round of the SHA3 function (if it is determined at 112 that 24 rounds have not yet completed), or is provided as an output state variable of the SHA3 operation (if it is determined at 112 that 24 rounds have completed).

Figure 2:
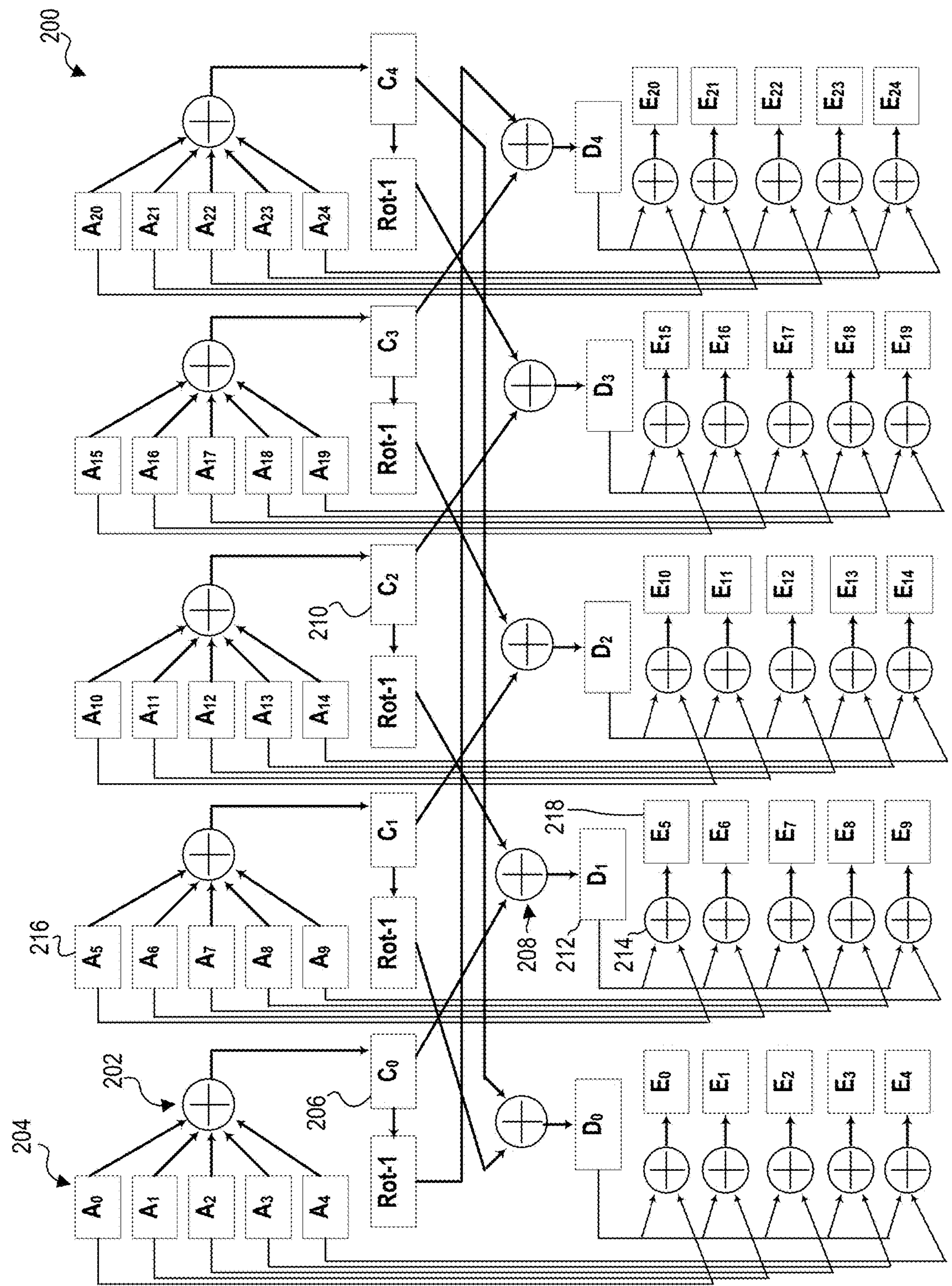
FIG. 2 illustrates an example simplified hardware architecture for implementing the θ-stage of FIG. 1.

FIG. 2 illustrates an example simplified hardware architecture 200 for implementing the θ-stage of FIG. 1. In the example shown, each block shown is 64-bits long. The A blocks each are subsets of a 1600-bit input state variable to the SHA3 operation (defined by the process 100 of FIG. 1). Further, A[i, j] maps to A[5*i+j] and the variable E is used to represent modified state A as defined in Equation (3) above. In some embodiments, the architecture 200 is implemented with 64×5 five-input and 64×30 two-input XOR gates. Further in some embodiments, bit rotation (Rot-1, i.e., a rotation by 1-bit) is implemented by rewiring that does not require any logic gates. Therefore, the example architecture 200 may consist of 1600 parallel execution paths, each of which formed by a critical path with 1 five-input XOR followed by 2 two-input XOR gates (as shown in FIG. 4A and described below).

The example architecture 200 performs a number (5 in this example) of first bitwise XOR operations (e.g., 202) on respective sets of input blocks (e.g., 204 (A0, A1, A2, A3, A4)), and yields a number (5 in this example) of first intermediate output blocks (e.g., 206 (C0)). The architecture 200 also performs a number (5 in this example) of second bitwise XOR operations (e.g., 208) on a first intermediate block (e.g., 206 (C0)) and a rotated, other first intermediate block (e.g., 210 (C2 rotated by 1-bit)) to yield a number (5 in this example) of second intermediate blocks (e.g., 212 (D1)). In the example shown, the first intermediate blocks operated on by the second bitwise XOR operations are two indices away from one another and are each one index away from the resulting second intermediate block (e.g., the XOR operation performed on C0 and rotated C2 produces D1). The architecture 200 also performs a number (25) of third bitwise XOR operations (e.g., 214) on a second intermediate block (e.g., 212 (D1)) and an input block (e.g., 216 (A5)) to yield a number (25) of third intermediate blocks (e.g., 218 (E5)). In the example shown, the index of the input block operated on by the third bitwise XOR operation matches the index of the third intermediate block produced by the third bitwise XOR operation (e.g., A5 is an input to the XOR operation that yields E5).

Figure 3:
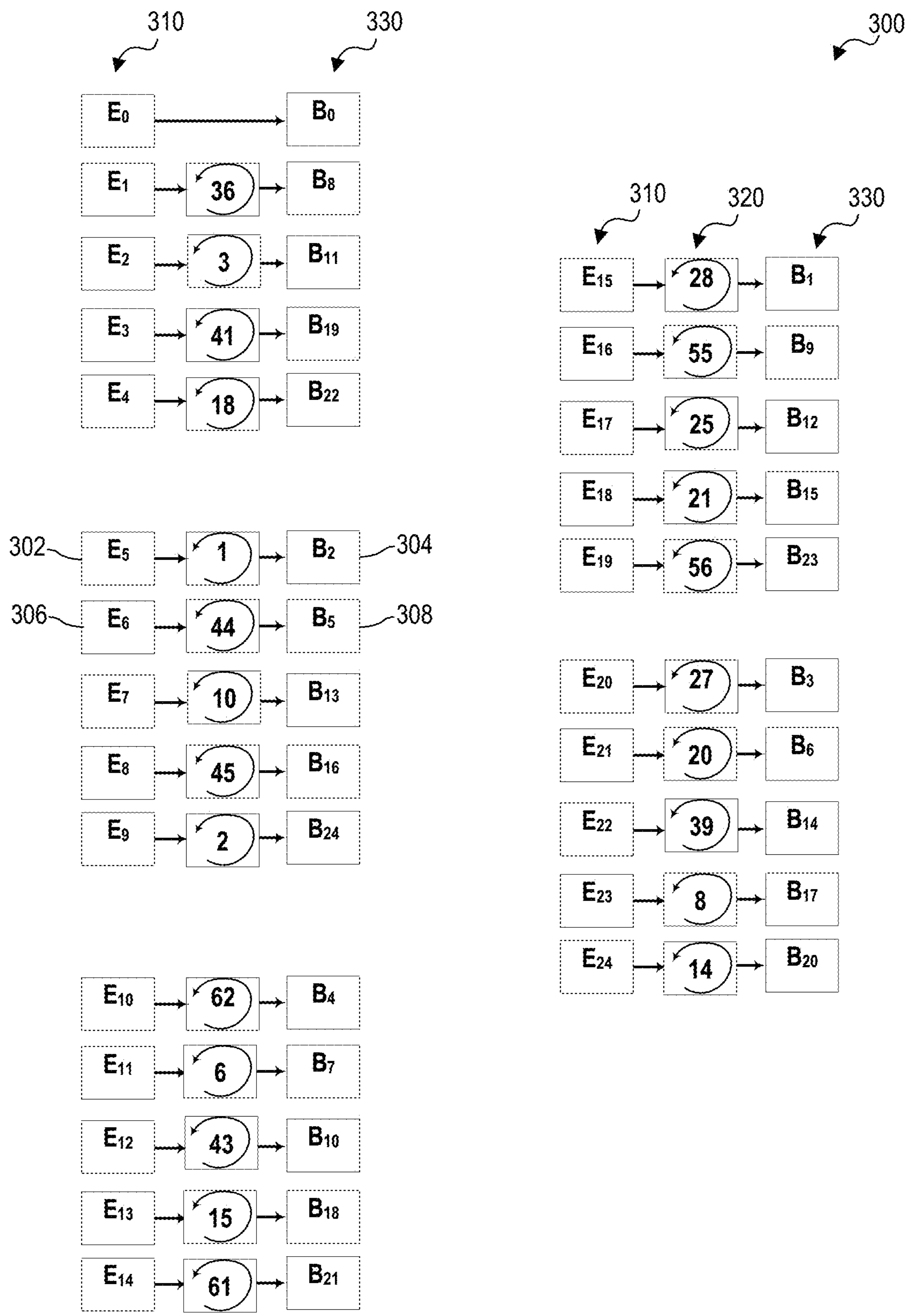
FIG. 3 illustrates an example simplified hardware architecture for implementing the ρ-stage and π-stage of FIG. 1.

FIG. 3 illustrates an example simplified hardware architecture 300 for implementing the ρ-stage and π-stage of FIG. 1. In the example shown, each block 310 corresponds to a third intermediate block of FIG. 2 with the same index (e.g., block 302 of FIG. 3 is the same as block 218 of FIG. 2). Each block 310 in FIG. 3 is rotated by the number of bits written in the rotation arrow blocks 320 to yield a fourth intermediate block 330. For example, the block 302 ($E_5$) in this example is rotated by 1-bit to yield the block 304 ($B_2$), while the block 306 ($E_6$) in this example is rotated by 44-bits to yield the block 308 ($B_5$).

In certain embodiments, the rotation performed by the example architecture 300 is implemented by wiring to reorder the bits in the respective blocks. Thus, the architecture 200 does not require any logic gates. In software executions, these rotations are quite complex to execute, and are typically executed as stores and fetches to/from memory. By executing the rotation through rewiring in hardware, an instantaneous computation of the ρ- and π-stages is accomplished.

The χ-stage takes the fourth intermediate blocks output by the architecture 300 of FIG. 3 (i.e., the B blocks), and perform an affine mapping to yield the next state bits for the SHA3 operation. In particular, each next state bit is realized as an affine map on three different bits of the fourth intermediate blocks from architecture 300 (as defined by Equation (5) above). In the ι-stage, a 64-bit variable (which may be referred to as a round constant) is added with the first 64 bits of 1600-bit χ-stage output. This stage is computed in parallel for each of the 64-bits. All 1600 next state bits are computed for these stages in parallel execution paths (one for each bit), with each execution path including 1 NOT gate, 1 AND gate, and 2 XOR gates as shown in FIG. 4B.

Figure 4B:
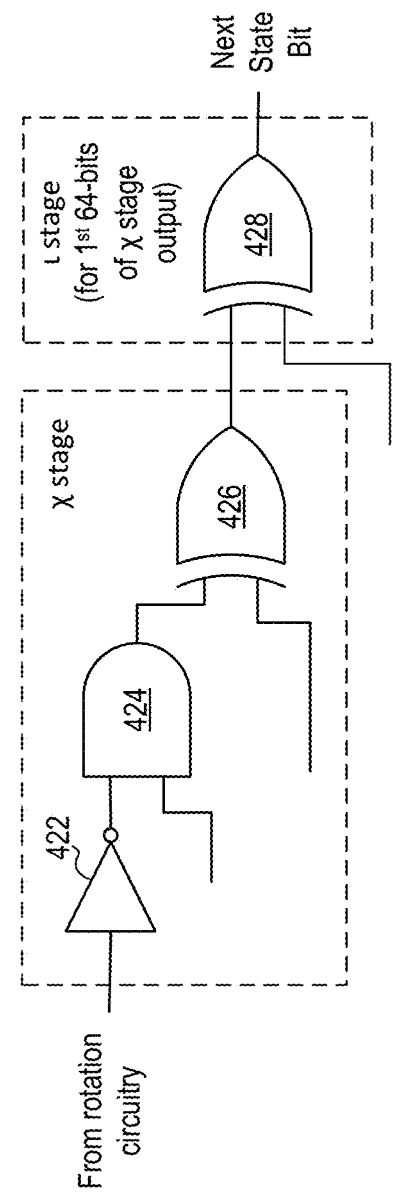
FIGS. 4A-4B are diagrams of example circuits to perform aspects of the θ-stage and the ρ- and π-stages, respectively.
Figure 4A:
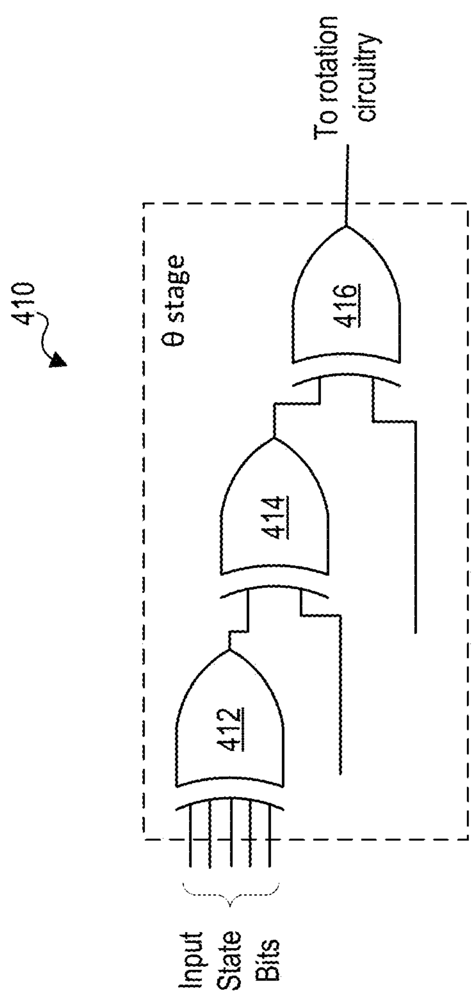

FIGS. 4A-4B are diagrams of example circuits to implement aspects of the θ-stage and the χ- and ι-stages. In particular, the circuit 410 may be used to implement portions of the θ-stage of the SHA3 operation, while the circuit 420 of FIG. 4B may be used to implement the χ- and ι-stages of the SHA3 operation.

The circuit 410 of FIG. 4A includes a first XOR gate 412 to perform an XOR function on five input state bits (e.g., the XOR operation 202 in FIG. 2), a second XOR gate 414 to perform an XOR function on an output of the first XOR gate and a value based on five other input state bits (e.g., the XOR operation 208 in FIG. 2), and a third XOR gate 416 to perform an XOR function on an output of the second XOR gate and another input state bit (e.g., the XOR operation 214 in FIG. 2). The output of the XOR gate 416 is then provided to rotation circuitry to perform a bit rotation (e.g., as described above with respect to FIG. 3). The circuit 420 of FIG. 4B includes an inverter 422 to invert a first output of the rotation circuitry, an AND gate 424 to perform an AND function on an output of the inverter and a second output of the rotation circuitry, and an XOR gate 426 to perform an XOR function on an output of the AND gate and a third output of the rotation circuitry. Where the output of the XOR gate 426 is one of the first 64-bits of the χ-stage output, the output of the XOR gate 426 is then provided to the XOR gate 428 of the ι-stage as shown, and the output of the XOR gate 428 is a next state bit for the SHA3 operation. In other cases, the output of the XOR gate 426 is a next state bit for the SHA3 operation.

Thus, in total, a SHA3 round function may be performed (for one bit) by 1 five-input XOR gate, 4 two-input XOR gates, 1 AND gate, and 1 NOT gate, which may take up little space on a processor and may allow the one round 1600-bit parallel hardware to operate at a very high clock speed (e.g., 4.6 GHz). The circuits 410, 420 of FIGS. 4A-4B may make up a critical path of a one-round, one-bit data path for a SHA3 operation. Therefore, in some embodiments (e.g., depending on the core operating clock frequency and the target technology (e.g., 14 nm, 10 nm, 7 nm, 5 nm, etc.)), these data paths may be implemented in series to perform multiple rounds within one clock period, increasing throughput. An example of this is shown in FIG. 6B and described further below.

Figure 5:
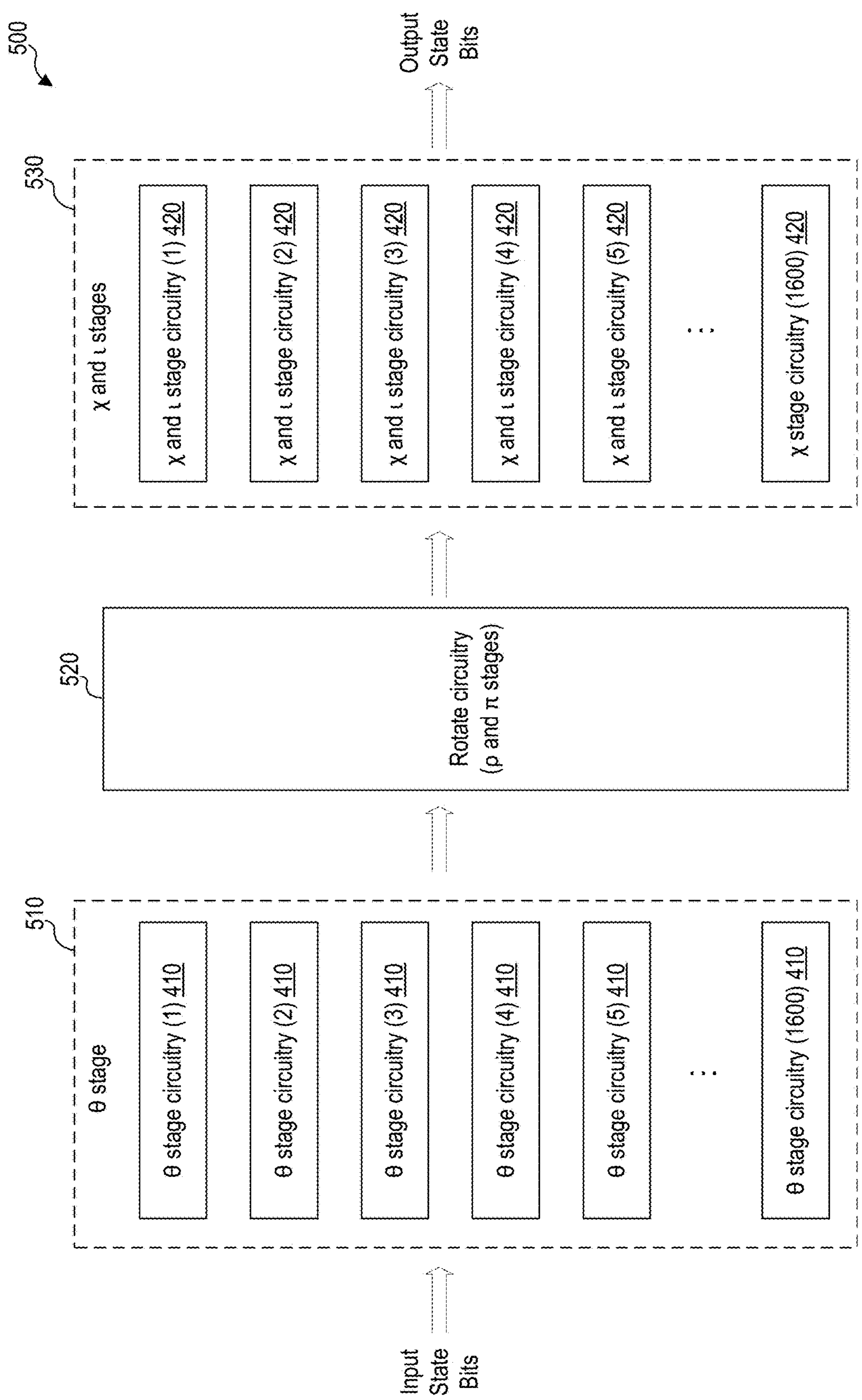
FIG. 5 is a simplified block diagram of an example round circuit to perform a round of a SHA3 operation.

FIG. 5 is a simplified block diagram of an example round circuit 500 to perform a round of a SHA3 operation. The round circuit 500 may perform a round of the SHA3 operation on 1600 input state bits as shown and provide 1600 output state bits. The example round circuit 500 includes a set of parallel first stage circuits 510 that receives a set of input state bits for the SHA3 operation. In the example shown, the first stage circuits include parallel logic circuits 410 of FIG. 4A. The set of first stage circuits may implement the architecture 200 of FIG. 2 to perform a θ-stage of the SHA3 operation. The round circuit 500 also includes rotation circuitry to receive the outputs of the first stage circuits and perform a rotation on the bits. The rotation circuitry may implement the architecture 300 of FIG. 3 to perform the ρ-stage and π-stage of the SHA3 operation. In some embodiments, the rotation circuitry includes wiring to reorder bits (to perform the rotation operation). The rotation circuitry may perform rotations on blocks of bits output by the first stage circuits 510 (e.g., as shown in FIG. 3). The round circuit 500 further includes a set of parallel third stage circuits 530 that receive the outputs of the rotation circuitry 520. In the example shown, the second stage circuits include parallel logic circuits 420 of FIG. 4B. The set of third stage circuits may perform the χ-stage and the ι-stage of the SHA3 operation. The output of the set of third stage circuits may be a next state bit for the SHA3 operation.

Figure 6A:
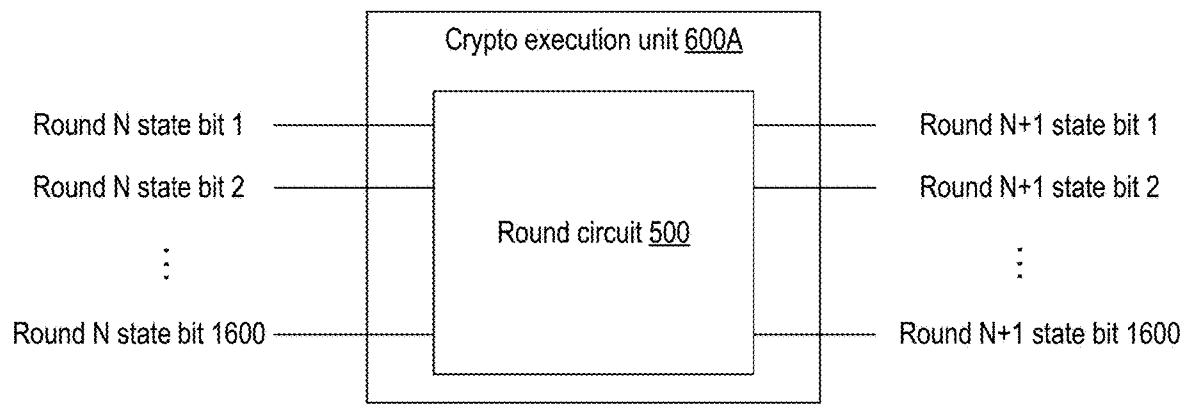
FIGS. 6A-6B are simplified block diagrams of cryptographic execution units of a processor that include one or more of the round circuits of FIG. 5.
Figure 6B:
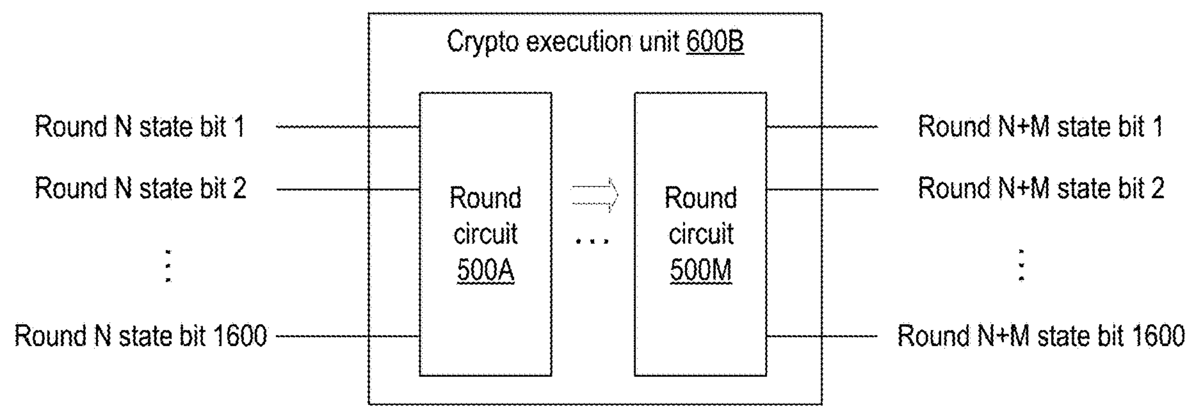

FIGS. 6A-6B are simplified block diagrams of cryptographic execution units 600 of a processor that include one or more of the round circuits 500 of FIG. 5. For instance, the cryptographic execution unit 600A of FIG. 6A includes a single round circuit 500, and accordingly may perform one round of a SHA3 operation. That is, the cryptographic execution unit 600A may receive 1600 input state bits for round N, perform one round of the SHA3 operation on the state bits, and provide the next round (N+1) state bits as output. In contrast, the cryptographic execution unit 600B of FIG. 6B includes multiple (e.g., M=2, 3, 4, or another divisor of 24) round circuits 500 in series, and accordingly may perform M rounds of a SHA3 operation. That is, the cryptographic execution unit 600B may receive 1600 input state bits for round N, perform M rounds of the SHA3 operation on the state bits, and provide round N+M state bits as output.

Figure 7:
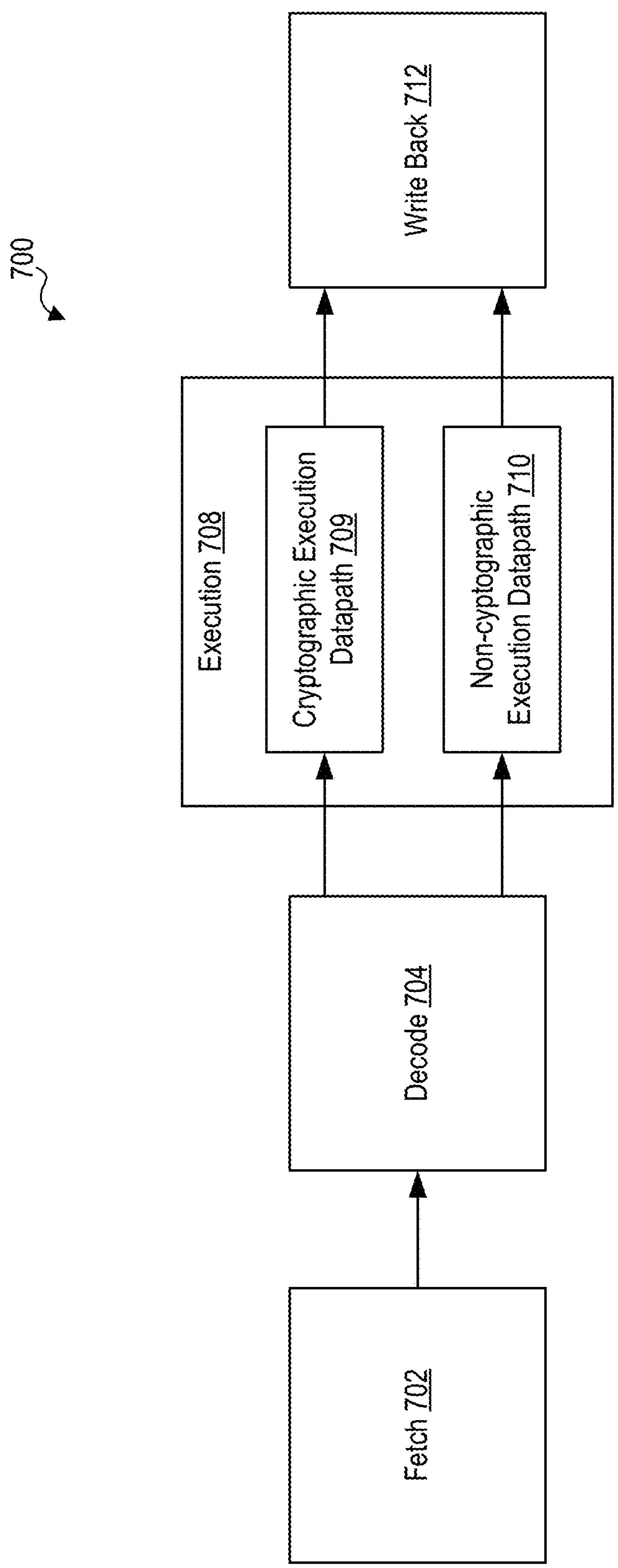
FIG. 7 is a simplified block diagram of a processor instruction pipeline architecture that incorporates a cryptographic data path in the execution stage in parallel with an existing non-cryptographic execution data path.

FIG. 7 is a simplified block diagram of a processor instruction pipeline architecture 700 that incorporates a cryptographic data path 709 in the execution stage 708 in parallel with an existing non-cryptographic execution data path 710. The example architecture includes a fetch stage 702 to fetch instructions from memory, and a decode stage 704 to decode the instructions. After the decode stage 704, cryptographic instructions (e.g., SHA3 instructions) are provided to the cryptographic execution data path 709 in the execution stage 708. In certain embodiments, the cryptographic execution data path 709 includes one or more cryptographic execution units that each includes hardware such as that described above with respect to FIGS. 2-6. Non-cryptographic instructions are provided to the non-cryptographic data path 710 in the execution stage 708. After instructions are completed, they are provided to the write-back stage 712 to be placed in memory.

Figure 8:
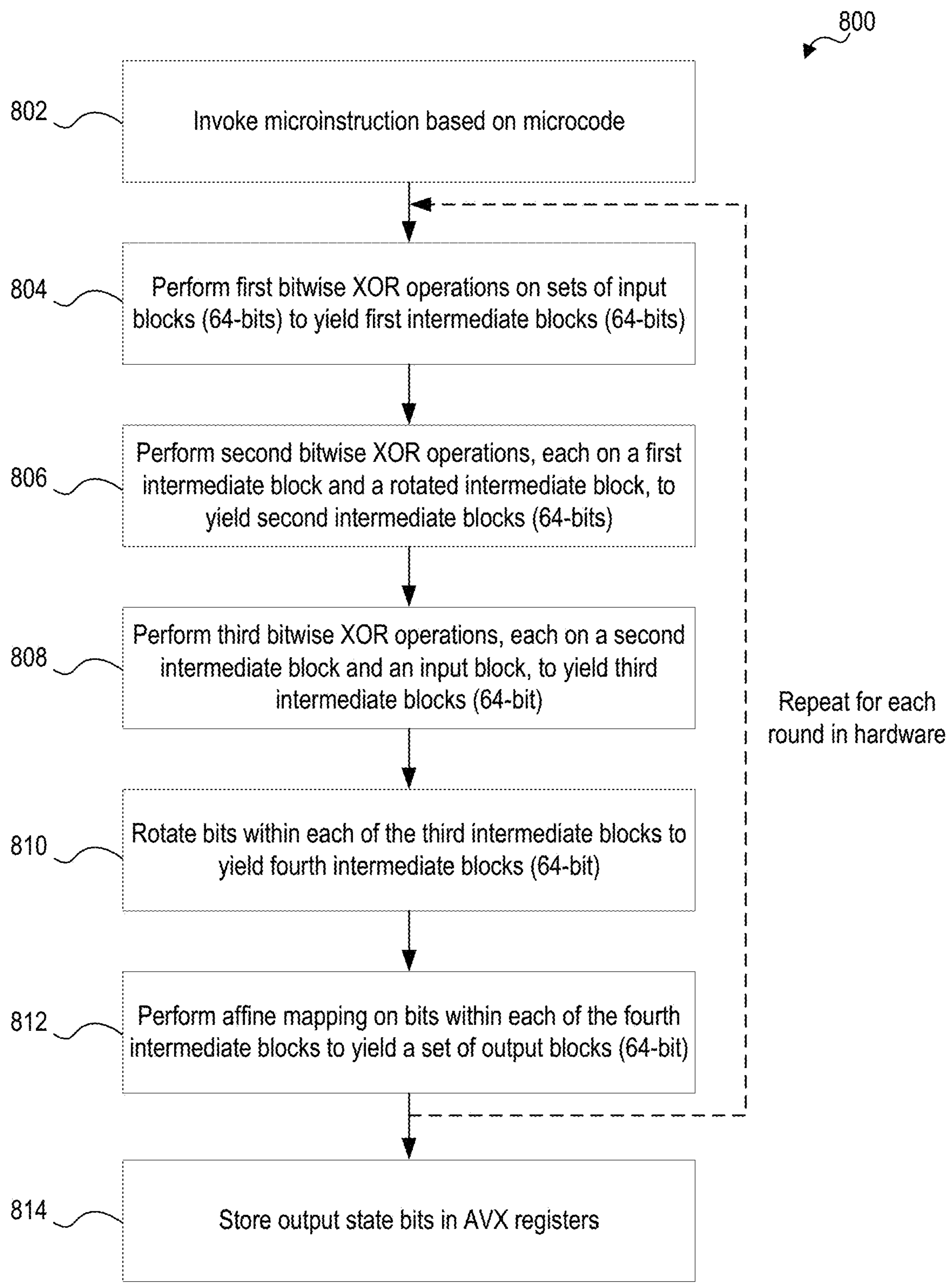
FIG. 8 is a flow diagram of an example process of executing one or more rounds of a SHA3 operation on a processor.

FIG. 8 is a flow diagram of an example process of executing one or more rounds of a SHA3 operation on a processor. Aspects of the example process 800 may be performed by a processor that includes a cryptographic execution unit (e.g., a processor that includes the one of the cryptographic execution units 600 of FIGS. 6A-6B, which include one or more round circuits 500 of FIG. 5, which include the circuits 410, 420 of FIGS. 4A-4B). The example process 800 may include additional or different operations, and the operations may be performed in the order shown or in another order. In some cases, one or more of the operations shown in FIG. 8 are implemented as processes that include multiple operations, sub-processes, or other types of routines. In some cases, operations can be combined, performed in another order, performed in parallel, iterated, or otherwise repeated or performed another manner.

At 802, a microinstruction is invoked based on a microcoded processor instruction to execute a SHA3 operation. The microinstruction may instruct execution of at least one round of the SHA3 operation on hardware circuitry (e.g., the architecture and circuitry described above). The microinstructions may be based on the hardware implementation of the hardware circuitry. For example, the microinstruction may instruct execution of one round where the hardware circuitry is implemented similar to the cryptographic execution unit 600A of FIG. 6A, but may instruct execution of M rounds where the hardware circuitry is implemented similar to the cryptographic execution unit 600B of FIG. 6B. In some cases, the microinstruction may be part of a set of microinstructions invoked by the microcoded processor instruction as described below.

Table 1 shows example microinstructions with corresponding names, data paths/clock cycles, and latencies for computing a complete SHA3 24-round permutation.

TABLE 1

| Microinstruction Name | Data path [Round/Clock] | Total latency for 1 SHA3 24-rounds permutation | Input & Output |
|---|---|---|---|
| SHA3SingleRound | 1 Round | 24 executions of the instruction (one after another) | Input: 1600-bit old state, round number Output: 1600-bit new state |
| SHA3TwoRounds | 2 Rounds | 12 executions of the instruction | Input: 1600-bit old state, the first round number in this invocation |
| SHA3ThreeRounds | 3 Rounds | 8 executions of the instruction | Output: 1600-bit new |

TABLE 1-continued

| Microinstruction Name | Data path [Round/Clock] | Total latency for 1 SHA3 24-rounds permutation | Input & Output |
|---|---|---|---|
| SHA3FourRounds | 4 Rounds | 6 executions of the instruction | state |

In some embodiments, a single microcoded instruction is exposed to a software developer to execute all 24-rounds of the SHA3 operation. The microcoded instruction may be implemented in microcode by utilizing a number of the microinstructions described above, depending on the hardware implementation. Thus, the software developer, by invoking a single microcoded instruction, may complete all 24 rounds of a SHA3 operation.

Table 2 shows example microcoded instructions, with corresponding names, data paths/clock cycles, and latencies.

TABLE 2

| Microcoded Instruction Name | Data path [Round/Clock] | Total latency for 1 SHA3 24-rounds permutation | Input & Output |
|---|---|---|---|
| SHA3Permutation | 1 Round | 24 clock cycles | Input: 1600-bit old state, message, SHA3-mode (optional) Output: 1600-bit new state |
| SHA3Permutation | 2 Rounds | 12 clock cycles | Input: 1600-bit old state, message, SHA3-mode (optional) Output: 1600-bit new state |

Both instructions in Table 2 may look same to the software developer perspective and may differ only in terms of latency. For instance, the first SHA3Permutation shown in Table 2 is based upon the SHA3SingleRound microinstruction of Table 1. In this example, the SHA3Permutation microcoded instruction invokes 24 instances of the SHA3SingleRound microinstruction, with each instance performing a single round on the hardware. Accordingly, this SHA3Permutation microcoded instruction may require 24 clock cycles to complete. In contrast, the second SHA3Permutation shown in Table 2 is based upon the SHA3TwoRounds microinstruction of Table 1. In this example, the SHA3Permutation microcoded instruction invokes 12 instances of the SHA3TwoRounds microinstruction, with each instance performing two rounds on the hardware. Accordingly, this SHA3Permutation microcoded instruction may require only 12 clock cycles to complete.

In certain embodiments, the SHA3Permutation instruction includes an initial XOR between the input state and the message. For SHA3 operations, the message size varies based on the SHA3 modes. Depending on the implementation of the instruction data path hardware architecture, it can be handled either of the following two ways. In one embodiment, a SHA3-mode may be included as an input parameter in the instruction. In this case, based on the SHA3-mode, the internal data path aligns the input message during the initial XOR operation with the old state. In another embodiment, the SHA3-mode is transparent to the execution data path. In this case, the instruction takes a fixed length (1344-bit, which is the maximum size of one input message block among all SHA3 modes) input message that is padded with zeros based on the actual SHA3-mode on which user wants to execute, and the execution data path simply XORs the 1600-bit input state with the input message. After the message XOR operation, the execution data path placed the 1600-bit value into an internal register and executes 24 SHA3 rounds iteratively, as described below.

At 804, a set of first bitwise XOR operations (e.g., 202 of FIG. 2) is performed on sets of 64-bit input blocks (e.g., blocks 204 of FIG. 2) to yield 64-bit first intermediate blocks (e.g., block 206 of FIG. 2). At 806, a set of second bitwise XOR operations (e.g., 208 of FIG. 2) is performed on pairs of the first intermediate blocks. In particular, each second bitwise XOR operation is performed on a first intermediate block (e.g., block 206 of FIG. 2) and a rotated intermediate block (e.g., block 210 of FIG. 2 rotated by 1-bit), to yield a 64-bit second intermediate block (e.g., 212 of FIG. 2). At 808, third bitwise XOR operations are performed. In particular, each third bitwise XOR operation (e.g., 214 of FIG. 2) is performed on a second intermediate block (e.g., 212 of FIG. 2) and an input block (e.g., 216 of FIG. 2) to yield 64-bit third intermediate blocks (e.g., 218 of FIG. 2). Operations 804, 806, 808 may be implemented by the architecture 200 shown in FIG. 2 and described above. The hardware to implement these operations may be based on the circuit 410 of FIG. 4A. Operations 804, 806, 808 may correspond to the θ-stage of the SHA3 operation.

At 810, bits within each of the third intermediate blocks are rotated to yield 64-bit fourth intermediate blocks (e.g., blocks 330 of FIG. 3). The number of bits each third intermediate block is rotated by may be based on function of the SHA3 operation (e.g., r[x, y] in Equation (4) above). In one embodiment, bit rotations to be performed are shown in blocks 320 of FIG. 3. In at least some embodiments, the bit rotations are implemented in hardware by wiring that reorders bits within each block.

At 812, an affine mapping is performed on bits within each of the fourth intermediate blocks to yield a set of 64-bit output blocks. Each of the output blocks may be a subset of the 1600 next state bits of the SHA3 operation. Operations 804-812 may implement a single round of a SHA3 operation. As shown in FIG. 8, operations 804-812 may be repeated for each round implemented in hardware. For example, if only one round is implemented in hardware (e.g., a single round circuit as shown in FIG. 6A), then the process 800 may not repeat operations 804-812. However, if multiple rounds are implemented in hardware (e.g., multiple round circuits in series as shown in FIG. 6B), then the process 800 may repeat operations 804-812 to complete the remaining number of rounds implemented in hardware. Once the number of rounds is completed, the hardware may output next state bits. The output blocks from 812 may be subsets of the next state bits.

At 814, the next state bits are stored in a set of Advanced Vector Extensions (AVX) registers within the processor. In some cases, the message bits may also be stored in the AVX registers. In total, the number of bits to be supported may be approximately 3 k-bits (e.g., 1344-bit message+1600-bit old state+others). These bits may be processed together in a cryptographic execution pipeline (e.g., data path 709 of FIG. 7) and a 1600-bit output may be captured from the pipeline to execute the SHA3Permutation instructions. In some cases, this may be supported through multiple AVX-512 ZMM registers that are concatenated to include the entire message. A total of 32×512-bit ZMM registers may be available in a processor, and AVX-512 instructions can specify up to 3 data register operands. This may be sufficient to contain the message input. It may be quite beneficial to support loading the message bits from registers to support applications that wish to keep a secret message from being stored to memory outside the processor. Alternatively, in some embodiments, the message may be loaded from memory as specified by a memory operand. The state accumulator that initially contains the old state prior to invoking a SHA3Permutation instruction to perform a SHA3 operation may be updated to contain the new state after invoking the SHA3Permutation instruction, and this new state may be contained within a fixed set of registers (e.g. ZMM0-3). Alternatively, the state accumulator may be stored in memory as identified by a memory operand. Other architectures may support specifying a larger number of register operands, which may allow specifying non-default registers for the state accumulator in addition to the message stored in registers.

In some embodiments, the Intel® Architecture Enhanced Vector Extension (EVEX) prefix format could be reinterpreted by instructions (e.g., the SHA3Permutation instruction described above) to enable software to encode ranges of register operands to overcome current limitations on the number of register operands. For example, in some instances, the first register operand might specify the index of the first ZMM containing the state accumulator, and the SHA3Permutation instruction would then use the four ZMM registers starting at that index as the state accumulator. The second register operand could specify the index of the first ZMM containing the message, and the SHA3Permutation instruction would then use the three ZMM registers starting at that index as the message input. Finally, the third register operand could specify a general-purpose register containing the parameters for the instruction. One benefit of reinterpreting two of the EVEX prefix register operands as the bases of register ranges may be that the SHA3Permutation instruction could be implemented for Intel AVX2, which only supports 16×256-bit YMM registers, and still support keeping the message input in registers rather than memory. The AVX2 variant of SHA3Permutation would use six YMM registers for the message input and seven YMM registers for the state accumulator. Some CPUs support AVX2 but not AVX-512, and AVX2 instructions sometimes run with lower power and higher frequency than AVX-512 instructions.

In another embodiment, a new register could be defined with sufficient storage for the entire state accumulator. A new instruction (e.g. SHA3Init) could be defined to initialize the register with the correct initial value for the SHA3 state. A second new instruction (e.g. SHA3LoadState) could be defined to initialize the register with a state value loaded from memory. A third new instruction (e.g. SHA3StoreState) could be defined to store the contents of the register to memory. The instructions to load and store the state could be useful when switching contexts. Variants of these instructions could be defined to transfer the state to and from vector or general-purpose registers. Other variants of those instructions could be defined to accept a KeyLocker key handle whose key could be used to encrypt or decrypt the state to keep it encrypted in memory (with authenticated encryption and decrypted in the register). KeyLocker may refer to a feature that encrypts key handles in memory using a CPU-internal wrapping key such that the key within the handle can only be used for purposes mediated by dedicated instructions. Alternatively, in some instances, the KeyLocker key wrapping key could be used implicitly for that purpose. The header value for the in-memory SHA3 state would be different from the header values for KeyLocker handles (e.g., as used for AES encryption).

Figure 9:
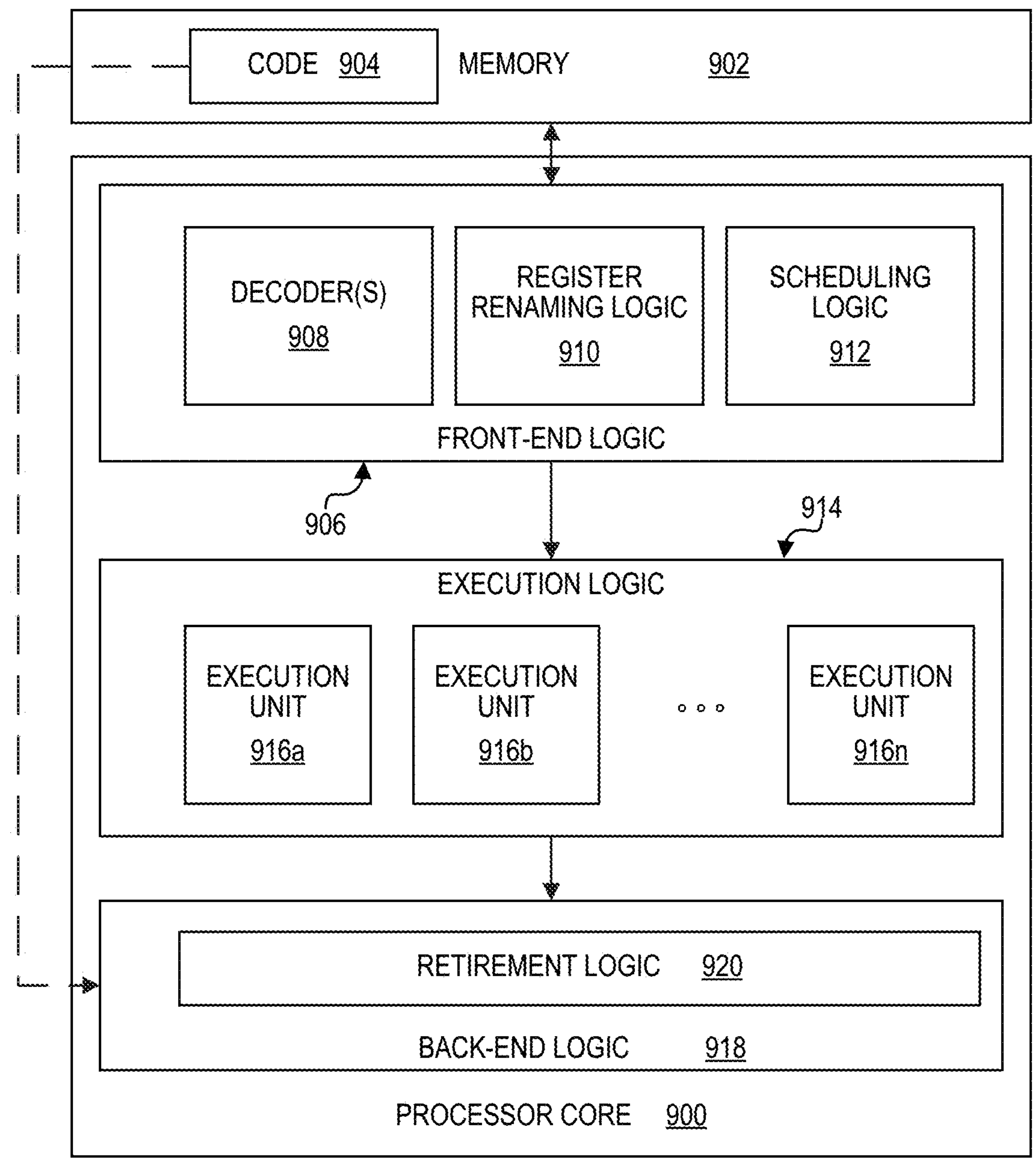
FIG. 9 is a block diagram illustrating an example processor core and memory according to at least one embodiment.
Figure 10:
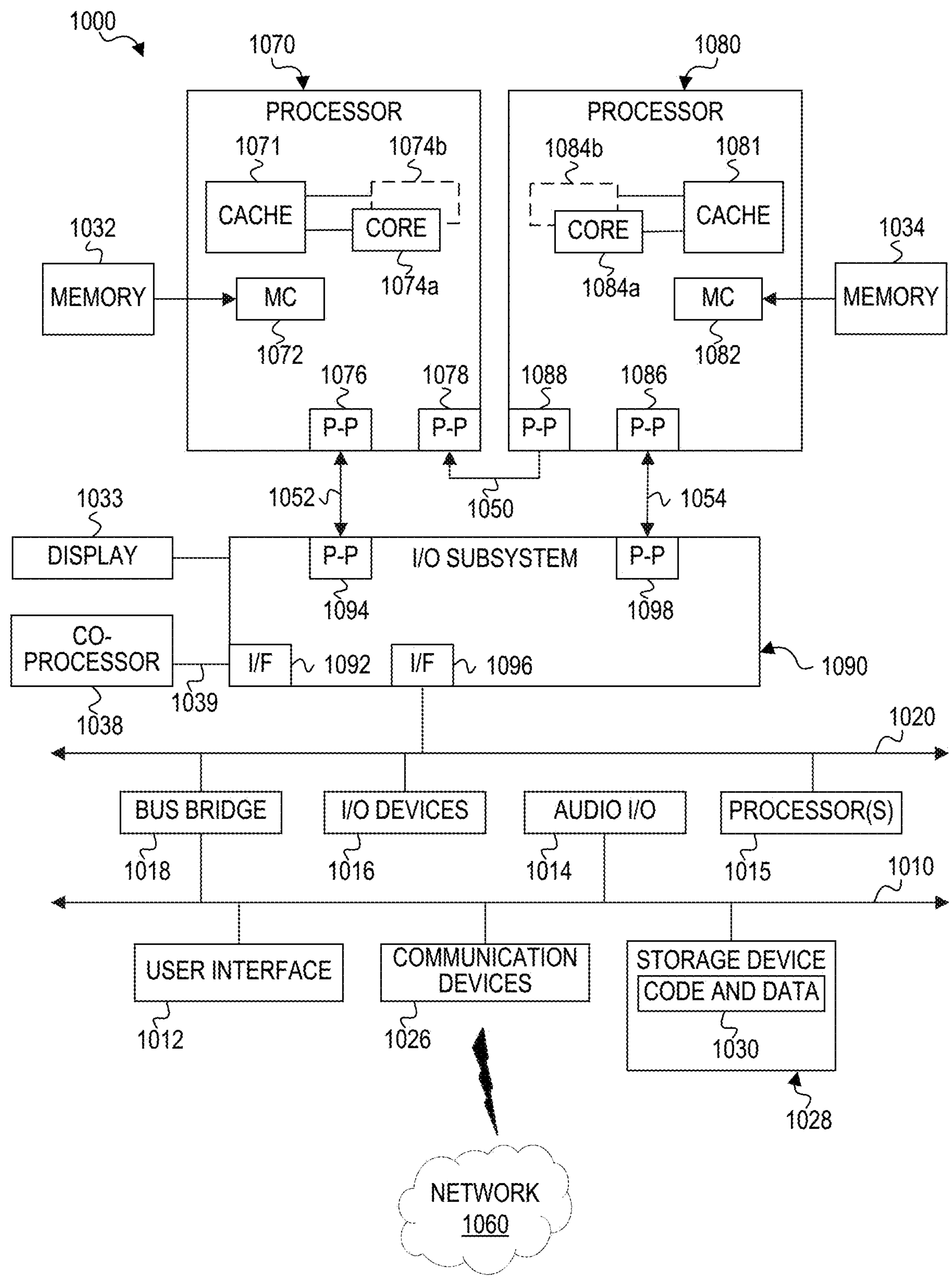
FIG. 10 is a block diagram of an example computer architecture according to at least one embodiment.

FIGS. 9-10 are block diagrams of exemplary computer architectures that may be used in accordance with embodiments disclosed herein. Generally, any computer architecture designs known in the art for processors and computing systems may be used. In an example, system designs and configurations known in the arts for laptops, desktops, handheld PCs, personal digital assistants, tablets, engineering workstations, servers, network devices, servers, appliances, network hubs, routers, switches, embedded processors, digital signal processors (DSPs), graphics devices, video game devices, set-top boxes, micro controllers, smart phones, mobile devices, wearable electronic devices, portable media players, hand held devices, and various other electronic devices, are also suitable for embodiments of computing systems described herein. Generally, suitable computer architectures for embodiments disclosed herein can include, but are not limited to, configurations illustrated in FIGS. 9-10.

FIG. 9 is an example illustration of a processor according to an embodiment. Processor 900 is an example of a type of hardware device that can be used in connection with the implementations above. Processor 900 may be any type of processor, such as a microprocessor, an embedded processor, a digital signal processor (DSP), a network processor, a multi-core processor, a single core processor, or other device to execute code. Although only one processor 900 is illustrated in FIG. 9, a processing element may alternatively include more than one of processor 900 illustrated in FIG. 9. Processor 900 may be a single-threaded core or, for at least one embodiment, the processor 900 may be multi-threaded in that it may include more than one hardware thread context (or "logical processor") per core.

FIG. 9 also illustrates a memory 902 coupled to processor 900 in accordance with an embodiment. Memory 902 may be any of a wide variety of memories (including various layers of memory hierarchy) as are known or otherwise available to those of skill in the art. Such memory elements can include, but are not limited to, random access memory (RAM), read only memory (ROM), logic blocks of a field programmable gate array (FPGA), erasable programmable read only memory (EPROM), and electrically erasable programmable ROM (EEPROM).

Processor 900 can execute any type of instructions associated with algorithms, processes, or operations detailed herein. Generally, processor 900 can transform an element or an article (e.g., data) from one state or thing to another state or thing.

Code 904, which may be one or more instructions to be executed by processor 900, may be stored in memory 902, or may be stored in software, hardware, firmware, or any suitable combination thereof, or in any other internal or external component, device, element, or object where appropriate and based on particular needs. In one example, processor 900 can follow a program sequence of instructions indicated by code 904. Each instruction enters a front-end logic 906 and is processed by one or more decoders 908. The decoder may generate, as its output, a micro operation such as a fixed width micro operation in a predefined format, or may generate other instructions, microinstructions, or control signals that reflect the original code instruction. Front-end logic 906 also includes register renaming logic 910 and scheduling logic 912, which generally allocate resources and queue the operation corresponding to the instruction for execution.

Processor 900 can also include execution logic 914 having a set of execution units 916*a*, 916*b*, 916*n*, etc. Some embodiments may include a number of execution units dedicated to specific functions or sets of functions. Other embodiments may include only one execution unit or one execution unit that can perform a particular function. Execution logic 914 performs the operations specified by code instructions.

After completion of execution of the operations specified by the code instructions, back-end logic 918 can retire the instructions of code 904. In one embodiment, processor 900 allows out of order execution but requires in order retirement of instructions. Retirement logic 920 may take a variety of known forms (e.g., re-order buffers or the like). In this manner, processor 900 is transformed during execution of code 904, at least in terms of the output generated by the decoder, hardware registers and tables utilized by register renaming logic 910, and any registers (not shown) modified by execution logic 914.

Although not shown in FIG. 9, a processing element may include other elements on a chip with processor 900. For example, a processing element may include memory control logic along with processor 900. The processing element may include I/O control logic and/or may include I/O control logic integrated with memory control logic. The processing element may also include one or more caches. In some embodiments, non-volatile memory (such as flash memory or fuses) may also be included on the chip with processor 900.

FIG. 10 illustrates a computing system 1000 that is arranged in a point-to-point (PtP) configuration according to an embodiment. In particular, FIG. 10 shows a system where processors, memory, and input/output devices are interconnected by a number of point-to-point interfaces. Generally, one or more of the computing systems or computing devices described herein may be configured in the same or similar manner as computing system 1000.

Processors 1070 and 1080 may be implemented as single core processors 1074*a* and 1084*a* or multi-core processors 1074*a*-1074*b* and 1084*a*-1084*b*. Processors 1070 and 1080 may each include a cache 1071 and 1081 used by their respective core or cores. A shared cache (not shown) may be included in either processors or outside of both processors, yet connected with the processors via P-P interconnect, such that either or both processors' local cache information may be stored in the shared cache if a processor is placed into a low power mode.

Processors 1070 and 1080 may also each include integrated memory controller logic (MC) 1072 and 1082 to communicate with memory elements 1032 and 1034, which may be portions of main memory locally attached to the respective processors. In alternative embodiments, memory controller logic 1072 and 1082 may be discrete logic separate from processors 1070 and 1080. Memory elements 1032 and/or 1034 may store various data to be used by processors 1070 and 1080 in achieving operations and functionality outlined herein.

Processors 1070 and 1080 may be any type of processor, such as those discussed in connection with other figures. Processors 1070 and 1080 may exchange data via a point-to-point (PtP) interface 1050 using point-to-point interface circuits 1078 and 1088, respectively. Processors 1070 and 1080 may each exchange data with an input/output (I/O) subsystem 1090 via individual point-to-point interfaces 1052 and 1054 using point-to-point interface circuits 1076, 1086, 1094, and 1098. I/O subsystem 1090 may also exchange data with a high-performance graphics circuit 1038 via a high-performance graphics interface 1039, using an interface circuit 1092, which could be a PtP interface circuit. In one embodiment, the high-performance graphics circuit 1038 is a special-purpose processor, such as, for example, a high-throughput MIC processor, a network or communication processor, compression engine, graphics processor, GPGPU, embedded processor, or the like. I/O subsystem 1090 may also communicate with a display 1033 for displaying data that is viewable by a human user. In alternative embodiments, any or all of the PtP links illustrated in FIG. 10 could be implemented as a multi-drop bus rather than a PtP link.

I/O subsystem 1090 may be in communication with a bus 1020 via an interface circuit 1096. Bus 1020 may have one or more devices that communicate over it, such as a bus bridge 1018 and I/O devices 1016. Via a bus 1010, bus bridge 1018 may be in communication with other devices such as a user interface 1012 (such as a keyboard, mouse, touchscreen, or other input devices), communication devices 1026 (such as modems, network interface devices, or other types of communication devices that may communicate through a computer network 1060), audio I/O devices 1014, and/or a data storage device 1028. Data storage device 1028 may store code and data 1030, which may be executed by processors 1070 and/or 1080. In alternative embodiments, any portions of the bus architectures could be implemented with one or more PtP links.

The computer system depicted in FIG. 10 is a schematic illustration of an embodiment of a computing system that may be utilized to implement various embodiments discussed herein. It will be appreciated that various components of the system depicted in FIG. 10 may be combined in a system-on-a-chip (SoC) architecture or in any other suitable configuration capable of achieving the functionality and features of examples and implementations provided herein.

Although this disclosure has been described in terms of certain implementations and generally associated methods, alterations and permutations of these implementations and methods will be apparent to those skilled in the art. For example, the actions described herein can be performed in a different order than as described and still achieve the desirable results. As one example, the processes depicted in the accompanying figures do not necessarily require the particular order shown, or sequential order, to achieve the desired results. In certain implementations, multitasking and parallel processing may be advantageous. Other variations are within the scope of the following claims.

The architectures presented herein are provided by way of example only, and are intended to be non-exclusive and non-limiting. Furthermore, the various parts disclosed are intended to be logical divisions only, and need not necessarily represent physically separate hardware and/or software components. Certain computing systems may provide memory elements in a single physical memory device, and in other cases, memory elements may be functionally distributed across many physical devices. In the case of virtual machine managers or hypervisors, all or part of a function may be provided in the form of software or firmware running over a virtualization layer to provide the disclosed logical function.

Note that with the examples provided herein, interaction may be described in terms of a single computing system. However, this has been done for purposes of clarity and example only. In certain cases, it may be easier to describe one or more of the functionalities of a given set of flows by only referencing a single computing system. Moreover, the system for deep learning and malware detection is readily scalable and can be implemented across a large number of components (e.g., multiple computing systems), as well as more complicated/sophisticated arrangements and configurations. Accordingly, the examples provided should not limit the scope or inhibit the broad teachings of the computing system as potentially applied to a myriad of other architectures.

As used herein, unless expressly stated to the contrary, use of the phrase 'at least one of' refers to any combination of the named elements, conditions, or activities. For example, 'at least one of X, Y, and Z' is intended to mean any of the following: 1) at least one X, but not Y and not Z; 2) at least one Y, but not X and not Z; 3) at least one Z, but not X and not Y; 4) at least one X and Y, but not Z; 5) at least one X and Z, but not Y; 6) at least one Y and Z, but not X; or 7) at least one X, at least one Y, and at least one Z.

Additionally, unless expressly stated to the contrary, the terms 'first', 'second', 'third', etc., are intended to distinguish the particular nouns (e.g., element, condition, module, activity, operation, claim element, etc.) they modify, but are not intended to indicate any type of order, rank, importance, temporal sequence, or hierarchy of the modified noun. For example, 'first X' and 'second X' are intended to designate two separate X elements that are not necessarily limited by any order, rank, importance, temporal sequence, or hierarchy of the two elements.

References in the specification to "one embodiment," "an embodiment," "some embodiments," etc., indicate that the embodiment(s) described may include a particular feature, structure, or characteristic, but every embodiment may or may not necessarily include that particular feature, structure, or characteristic. Moreover, such phrases are not necessarily referring to the same embodiment.

While this specification contains many specific implementation details, these should not be construed as limitations on the scope of any embodiments or of what may be claimed, but rather as descriptions of features specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable sub combination. Moreover, although features may be described above as acting in certain combinations and even initially claimed as such, one or more features from a claimed combination can in some cases be excised from the combination, and the claimed combination may be directed to a sub combination or variation of a sub combination.

Similarly, the separation of various system components and modules in the embodiments described above should not be understood as requiring such separation in all embodiments. It should be understood that the described program components, modules, and systems can generally be integrated together in a single software product or packaged into multiple software products.

Thus, particular embodiments of the subject matter have been described. Other embodiments are within the scope of this disclosure. Numerous other changes, substitutions, variations, alterations, and modifications may be ascertained to one skilled in the art and it is intended that the present disclosure encompass all such changes, substitutions, variations, alterations, and modifications as falling within the scope of the appended claims.

The following examples pertain to embodiments in accordance with this specification. It will be understood that one or more aspects of certain examples described below may be combined with or implemented in certain other examples, including examples not explicitly indicated.

Example 1 includes a processor comprising a cryptographic execution unit to perform a Secure Hash Algorithm 3 (SHA3) operation, the cryptographic execution unit comprising at least one round circuit to receive a set of input state bits for the SHA3 operation and yield a set of output state bits for the SHA3 operation. Each round circuit includes a first stage circuit to: perform a set of first bitwise XOR operations, wherein each first bitwise XOR operation is performed on a set of five input blocks and yields a first intermediate output block, each input block comprising a subset of the input state bits; perform a set of second bitwise XOR operations, wherein each second bitwise XOR operation is performed on a first intermediate block and a rotation of another first intermediate block and yields a second intermediate block; and perform a set of third bitwise XOR operations, wherein each third bitwise XOR operation is performed on a second intermediate block and an input block and yields a third intermediate block. Each round circuit also includes a second stage circuit to rotate bits within each of the third intermediate blocks to yield a set of fourth intermediate blocks. Each round circuit further includes a third stage circuit to perform an affine mapping on bits within each of the fourth intermediate blocks to yield a set of output blocks, wherein each output block comprises a subset of the output state bits. The processor further comprises memory coupled to the cryptographic execution unit comprising microcode to invoke a set of microinstructions to execute the SHA3 operation on the cryptographic execution unit.

Example 2 includes the subject matter of Example 1, and optionally, wherein the input blocks are subsets of a set of input state bits for the SHA3 operation, and the output blocks are subsets of a set of next state bits for the SHA3 operation.

Example 3 includes the subject matter of any one of the preceding Examples, and optionally, wherein the number of bits rotated within each third intermediate is based on a function of the SHA3 operation.

Example 4 includes the subject matter of any one of the preceding Examples, and optionally, wherein each of the input blocks, first intermediate blocks, second intermediate blocks, third intermediate blocks, fourth intermediate blocks, and output blocks are 64-bits.

Example 5 includes the subject matter of any one of the preceding Examples, and optionally, wherein the first stage circuit comprises a set of logic circuits, each comprising: a first XOR gate to perform an XOR function on five input state bits; a second XOR gate to perform an XOR function on an output of the first XOR gate and a value based on five other input state bits; a third XOR gate to perform an XOR function on an output of the second XOR gate and another input state bit.

Example 6 includes the subject matter of any one of the preceding Examples, and optionally, wherein the second stage circuit comprises wiring to reorder bits within each of the third intermediate blocks.

Example 7 includes the subject matter of any one of the preceding Examples, and optionally, wherein the third stage circuit comprises a set of logic circuits, each comprising: an inverter to invert a first output of the second stage circuit; an AND gate to perform and AND function on an output of the inverter and a second output of the second stage circuit; and a fourth XOR gate to perform an XOR function on an output of the AND gate and a third output of the second stage circuit.

Example 8 includes the subject matter of any one of Examples 1-7, and optionally, wherein the set of instructions invoked by the microcode includes 24 microinstructions, each microinstruction to execute a round of the SHA3 operation using the cryptographic execution unit.

Example 9 includes the subject matter of any one of Examples 1-7, and optionally, wherein: the cryptographic execution unit comprises a first round circuit to perform a first round of the SHA3 operation and a second round circuit to perform a second round of the SHA3 operation, the second round circuit to receive outputs of the first round circuit as input state bits; and the set of instructions includes twelve microinstructions, each microinstruction to execute two rounds of the SHA3 operation using the first and second round circuits.

Example 10 includes the subject matter of any one of Examples 1-7, and optionally, wherein the cryptographic execution unit comprises a first round circuit to perform a first round of the SHA3 operation, a second round circuit to perform a second round of the SHA3 operation, and a third round circuit to perform a third round of the SHA3 operation, the second round circuit to receive outputs of the first round circuit as input state bits and the third round circuit to receive outputs of the second round circuit as input state bits; and the set of instructions includes eight microinstructions, each microinstruction to execute three rounds of the SHA3 operation using the first, second, and third round circuits.

Example 11 includes the subject matter of any one of Examples 1-7, and optionally, wherein the cryptographic execution unit comprises a first round circuit to perform a first round of the SHA3 operation, a second round circuit to perform a second round of the SHA3 operation, a third round circuit to perform a third round of the SHA3 operation, and a fourth round circuit to perform a fourth round of the SHA3 operation, the second round circuit to receive outputs of the first round circuit as input state bits, the third round circuit to receive outputs of the second round circuit as input state bits, and the fourth round circuit to receive outputs of the third round circuit as input state bits; and the set of instructions includes four microinstructions, each microinstruction to execute four rounds of the SHA3 operation using the first, second, third, and fourth round circuits.

Example 12 includes the subject matter of any one of the preceding Examples, and optionally, further comprising a non-cryptographic execution unit in parallel with the cryptographic execution unit.

Example 13 includes the subject matter of any one of the preceding Examples, and optionally, further comprising Advanced Vector Extensions (AVX) registers to store at least one of the input state bits and the output state bits.

Example 14 includes the subject matter of Example 13, and optionally, wherein the memory further comprises an instruction to initialize the registers with an initial value for the input state bits for the SHA3 operation.

Example 15 includes the subject matter of Example 13, and optionally, wherein the memory further comprises an instruction to load an initial value for the input state bits for the SHA3 operation into the registers from memory outside the processor.

Example 16 includes the subject matter of Example 13, and optionally, wherein the memory further comprises an instruction to store the output state bits in the registers into memory outside the processor.

Example 17 includes the subject matter of Example 16, and optionally, wherein the memory further comprises instructions to encrypt the output state bits before storing the output state bits into the memory outside the processor.

Example 18 includes apparatus to perform a Secure Hash Algorithm 3 (SHA3) operation, the apparatus comprising at least one round circuit to perform a round of the SHA3 operation. Each round circuit includes a set of parallel first stage circuits to receive a set of input state bits, each first stage circuit comprising: a first XOR gate to perform an XOR function on five input state bits; a second XOR gate to perform an XOR function on an output of the first XOR gate and a value based on five other input state bits; and a third XOR gate to perform an XOR function on an output of the second XOR gate and another input state bit. Each round circuit also includes second stage circuitry to perform a rotation operation on the set of bits output by the third XOR gates of the first stage circuits. Each round circuit further includes a set of parallel third stage circuits to receive outputs of the second stage circuitry, each third stage circuit comprising: an inverter to invert a first output of the second stage circuitry; an AND gate to perform and AND function on an output of the inverter and a second output of the second stage circuitry; and a fourth XOR gate to perform an XOR function on an output of the AND gate and a third output of the second stage circuitry, wherein a next state bit of the SHA3 operation is based on the output of the fourth XOR gate.

Example 19 includes the subject matter of Example 18, and optionally, wherein the apparatus comprises a first round circuit to perform a first round of the SHA3 operation and a second round circuit to perform a second round of the SHA3 operation, the second round circuit to receive outputs of the first round circuit as input state bits.

Example 20 includes the subject matter of Example 19, and optionally, wherein the apparatus further comprises a third round circuit to perform a third round of the SHA3 operation, the third round circuit to receive outputs of the second round circuit as input state bits.

Example 21 includes the subject matter of Example 20, and optionally, wherein the apparatus further comprises a fourth round circuit to perform a fourth round of the SHA3 operation, the fourth round circuit to receive outputs of the third round circuit as input state bits.

Example 22 includes the subject matter of any one of Examples 18-21, and optionally, wherein the value based on five other input state bits is based on an output of a first XOR gate of another first stage circuit.

Example 23 includes the subject matter of any one of Examples 18-21, and optionally, wherein the second stage circuitry comprises wiring to reorder the set of bits output by the third XOR gates of the first stage circuits.

Example 24 includes the subject matter of any one of Examples 18-21, and optionally, wherein the apparatus comprises 1600 parallel first stage circuits and 1600 parallel third stage circuits.

Example 25 includes a method comprising: receiving, at a processor, a microcoded instruction to execute a Secure Hash Algorithm 3 (SHA3) operation and invoking a set of microinstructions based on the microcoded instruction, each microinstruction to execute at least one round of the SHA3 operation on hardware circuitry by: performing a set of first bitwise XOR operations, wherein each first bitwise XOR operation is performed on a set of five input blocks and yields a first intermediate output block, each input block comprising a subset of bits of a set of state bits for the SHA3 operation; performing a set of second bitwise XOR operations, wherein each second bitwise XOR operation is performed on a first intermediate block and a rotation of another first intermediate block and yields a second intermediate block; performing a set of third bitwise XOR operations, wherein each third bitwise XOR operation is performed on a second intermediate block and an input block and yields a third intermediate block; rotating bits within each of the third intermediate blocks to yield a set of fourth intermediate blocks; and performing an affine mapping on bits within each of the fourth intermediate blocks to yield a set of output blocks.

Example 26 includes the subject matter of Example 25, and optionally, wherein set of instructions includes 24 microinstructions, each microinstruction to execute one round of the SHA3 operation.

Example 27 includes the subject matter of Example 25, and optionally, wherein the set of instructions includes twelve microinstructions, each microinstruction to execute two rounds of the SHA3 operation.

Example 28 includes the subject matter of Example 25, and optionally, wherein the set of instructions includes eight microinstructions, each microinstruction to execute three rounds of the SHA3 operation.

Example 29 includes the subject matter of Example 25, and optionally, wherein the set of instructions includes six microinstructions, each microinstruction to execute four rounds of the SHA3 operation.

Example 30 includes the subject matter of Example 25, and optionally, further comprising storing the bits of the output blocks as next state bits for the SHA3 operation.

Example 31 includes a system comprising: means to perform a set of first bitwise XOR operations, wherein each first bitwise XOR operation is performed on a set of five input blocks and yields a first intermediate output block, each input block comprising a subset of bits of a set of state bits for the SHA3 operation; means to perform a set of second bitwise XOR operations, wherein each second bitwise XOR operation is performed on a first intermediate block and a rotation of another first intermediate block and yields a second intermediate block; means to perform a set of third bitwise XOR operations, wherein each third bitwise XOR operation is performed on a second intermediate block and an input block and yields a third intermediate block; means to rotate bits within each of the third intermediate blocks to yield a set of fourth intermediate blocks; and means to perform an affine mapping on bits within each of the fourth intermediate blocks to yield a set of output blocks.

Example 32 includes the subject matter of Example 31, and optionally, further comprising means to invoke a set of microinstructions based on a microcoded instruction to perform a SHA3 operation.

Example 33 includes the subject matter of Example 31, and optionally, further comprising means to store the bits of the output blocks as next state bits for the SHA3 operation.

Example 34 may include a device comprising logic, modules, circuitry, or other means to perform one or more elements of a method described in or related to any of the examples above or any other method or process described herein.

What is claimed is:

1. A processor comprising:

a cryptographic execution unit to perform a Secure Hash Algorithm 3 (SHA3) operation, the cryptographic execution unit comprising at least one round circuit to receive a set of input state bits for the SHA3 operation and yield a set of output state bits for the SHA3 operation, each round circuit comprising:

a first stage circuit to:

perform a set of first bitwise XOR operations, wherein each first bitwise XOR operation is performed on a set of five input blocks and yields a first intermediate output block, each input block comprising a subset of the input state bits;

perform a set of second bitwise XOR operations, wherein each second bitwise XOR operation is performed on a first intermediate block and a rotation of another first intermediate block and yields a second intermediate block; and perform a set of third bitwise XOR operations, wherein each third bitwise XOR operation is performed on a second intermediate block and an input block and yields a third intermediate block;

a second stage circuit to rotate bits within each of the third intermediate blocks to yield a set of fourth intermediate blocks; and a third stage circuit to perform an affine mapping on bits within each of the fourth intermediate blocks to yield a set of output blocks, wherein each output block comprises a subset of the output state bits; and memory coupled to the cryptographic execution unit comprising microcode to invoke a set of microinstructions to execute the SHA3 operation on the cryptographic execution unit.

2. The processor of claim 1, wherein the input blocks are subsets of a set of input state bits for the SHA3 operation, and the output blocks are subsets of a set of next state bits for the SHA3 operation.

3. The processor of claim 1, wherein the number of bits rotated within each third intermediate is based on a function of the SHA3 operation.

4. The processor of claim 1, wherein each of the input blocks, first intermediate blocks, second intermediate blocks, third intermediate blocks, fourth intermediate blocks, and output blocks are 64-bits.

5. The processor of claim 1, wherein the first stage circuit comprises a set of logic circuits, each comprising:

a first XOR gate to perform an XOR function on five input state bits;

a second XOR gate to perform an XOR function on an output of the first XOR gate and a value based on five other input state bits; and a third XOR gate to perform an XOR function on an output of the second XOR gate and another input state bit.

6. The processor of claim 1, wherein the second stage circuit comprises wiring to reorder bits within each of the third intermediate blocks.

7. The processor of claim 1, wherein the third stage circuit comprises a set of logic circuits, each comprising:

an inverter to invert a first output of the second stage circuit;

an AND gate to perform and AND function on an output of the inverter and a second output of the second stage circuit; and a fourth XOR gate to perform an XOR function on an output of the AND gate and a third output of the second stage circuit.

8. The processor of claim 1, wherein the set of instructions invoked by the microcode includes 24 microinstructions, each microinstruction to execute a round of the SHA3 operation using the cryptographic execution unit.

9. The processor of claim 1, wherein:

the cryptographic execution unit comprises a first round circuit to perform a first round of the SHA3 operation and a second round circuit to perform a second round of the SHA3 operation, the second round circuit to receive outputs of the first round circuit as input state bits; and the set of instructions includes twelve microinstructions, each microinstruction to execute two rounds of the SHA3 operation using the first and second round circuits.

10. The processor of claim 1, wherein:

the cryptographic execution unit comprises a first round circuit to perform a first round of the SHA3 operation, a second round circuit to perform a second round of the SHA3 operation, and a third round circuit to perform a third round of the SHA3 operation, the second round circuit to receive outputs of the first round circuit as input state bits and the third round circuit to receive outputs of the second round circuit as input state bits; and the set of instructions includes eight microinstructions, each microinstruction to execute three rounds of the SHA3 operation using the first, second, and third round circuits.

11. The processor of claim 1, wherein:

the cryptographic execution unit comprises a first round circuit to perform a first round of the SHA3 operation, a second round circuit to perform a second round of the SHA3 operation, a third round circuit to perform a third round of the SHA3 operation, and a fourth round circuit to perform a fourth round of the SHA3 operation, the second round circuit to receive outputs of the first round circuit as input state bits, the third round circuit to receive outputs of the second round circuit as input state bits, and the fourth round circuit to receive outputs of the third round circuit as input state bits; and the set of instructions includes four microinstructions, each microinstruction to execute four rounds of the SHA3 operation using the first, second, third, and fourth round circuits.

12. The processor of claim 1, further comprising a non-cryptographic execution unit in parallel with the cryptographic execution unit.

13. The processor of claim 1, further comprising Advanced Vector Extensions (AVX) registers to store at least one of the input state bits and the output state bits.

14. The processor of claim 13, wherein the memory further comprises an instruction to initialize the registers with an initial value for the input state bits for the SHA3 operation.

15. The processor of claim 13, wherein the memory further comprises an instruction to load an initial value for the input state bits for the SHA3 operation into the registers from memory outside the processor.

16. The processor of claim 13, wherein the memory further comprises an instruction to store the output state bits in the registers into memory outside the processor.

17. The processor of claim 16, wherein the memory further comprises instructions to encrypt the output state bits before storing the output state bits into the memory outside the processor.

18. An apparatus comprising:

at least one round circuit to perform a round of a Secure Hash Algorithm 3 (SHA3) operation, each round circuit comprising:

a set of parallel first stage circuits to receive a set of input state bits of the SHA3 operation, each first stage circuit comprising:

a first XOR gate to perform an XOR function on five input state bits;

a second XOR gate to perform an XOR function on an output of the first XOR gate and a value based on five other input state bits; and a third XOR gate to perform an XOR function on an output of the second XOR gate and another input state bit;

second stage circuitry to perform a rotation operation on the set of bits output by the third XOR gates of the first stage circuits; and a set of parallel third stage circuits to receive outputs of the second stage circuitry, each third stage circuit comprising:

an inverter to invert a first output of the second stage circuitry;

an AND gate to perform and AND function on an output of the inverter and a second output of the second stage circuitry; and a fourth XOR gate to perform an XOR function on an output of the AND gate and a third output of the second stage circuitry, wherein a next state bit of the SHA3 operation is based on the output of the fourth XOR gate.

19. The apparatus of claim 18, wherein the apparatus comprises a first round circuit to perform a first round of the SHA3 operation and a second round circuit to perform a second round of the SHA3 operation, the second round circuit to receive outputs of the first round circuit as input state bits.

20. The apparatus of claim 19, wherein the apparatus further comprises a third round circuit to perform a third round of the SHA3 operation, the third round circuit to receive outputs of the second round circuit as input state bits.

21. The apparatus of claim 20, wherein the apparatus further comprises a fourth round circuit to perform a fourth round of the SHA3 operation, the fourth round circuit to receive outputs of the third round circuit as input state bits.

22. The apparatus of claim 18, wherein the value based on five other input state bits is based on an output of a first XOR gate of another first stage circuit.

23. The apparatus of claim 18, wherein the second stage circuitry comprises wiring to reorder the set of bits output by the third XOR gates of the first stage circuits.

24. A method comprising:

receiving, at a processor, a microcoded instruction to execute a Secure Hash Algorithm 3 (SHA3) operation; and invoking a set of microinstructions based on the microcoded instruction, each microinstruction to execute at least one round of the SHA3 operation on hardware circuitry by:

performing a set of first bitwise XOR operations, wherein each first bitwise XOR operation is performed on a set of five input blocks and yields a first intermediate output block, each input block comprising a subset of bits of a set of state bits for the SHA3 operation;

performing a set of second bitwise XOR operations, wherein each second bitwise XOR operation is performed on a first intermediate block and a rotation of another first intermediate block and yields a second intermediate block;

performing a set of third bitwise XOR operations, wherein each third bitwise XOR operation is performed on a second intermediate block and an input block and yields a third intermediate block;

rotating bits within each of the third intermediate blocks to yield a set of fourth intermediate blocks; and performing an affine mapping on bits within each of the fourth intermediate blocks to yield a set of output blocks.

25. The method of claim 24, wherein the input blocks are subsets of a set of input state bits for the SHA3 operation, and the output blocks are subsets of a set of next state bits for the SHA3 operation.

* * * * *